(12) United States Patent
Allison

(10) Patent No.: US 6,965,326 B2
(45) Date of Patent: Nov. 15, 2005

(54) AUTOMATED ELECTRONIC MODULE CONFIGURATION WITHIN A VEHICLE

(75) Inventor: Thomas A. Allison, Redford, MI (US)

(73) Assignee: General Motors Corporation, Detroit, MI (US)

( * ) Notice: Subject to any disclaimer, the term of this patent is extended or adjusted under 35 U.S.C. 154(b) by 81 days.

(21) Appl. No.: 10/623,921

(22) Filed: Jul. 21, 2003

(65) Prior Publication Data

US 2005/0017851 A1    Jan. 27, 2005

(51) Int. Cl.[7] .............................................. B60Q 1/00
(52) U.S. Cl. .................. 340/999; 340/425.5; 307/10.1
(58) Field of Search ............. 455/426.1; 717/168–173; 340/425.5–490, 99; 307/10.1

(56) References Cited

U.S. PATENT DOCUMENTS 5,870,018 A * 2/1999 Person et al. .............. 340/5.65

2003/0188303 A1 * 10/2003 Barman et al. ............. 717/170
2004/0203692 A1 * 10/2004 Schwinke et al. .......... 455/419
2004/0203730 A1 * 10/2004 Fraser et al. ............. 455/426.1

* cited by examiner

Primary Examiner—Jeffery Hofsass
Assistant Examiner—George Bugg
(74) Attorney, Agent, or Firm—Anthony Luke Simon

(57) ABSTRACT

The present invention provides a system and method for automated configuration of an electronic module within a vehicle. A first vehicle identification number stored in the electronic module is determined and a second vehicle identification number stored in the vehicle is determined. The first vehicle identification number from the electronic module and the second vehicle identification number from the vehicle are compared and the electronic module is configured based on the comparison. A computer usable medium with suitable computer program code is employed to configure an electronic module within a vehicle.

17 Claims, 2 Drawing Sheets

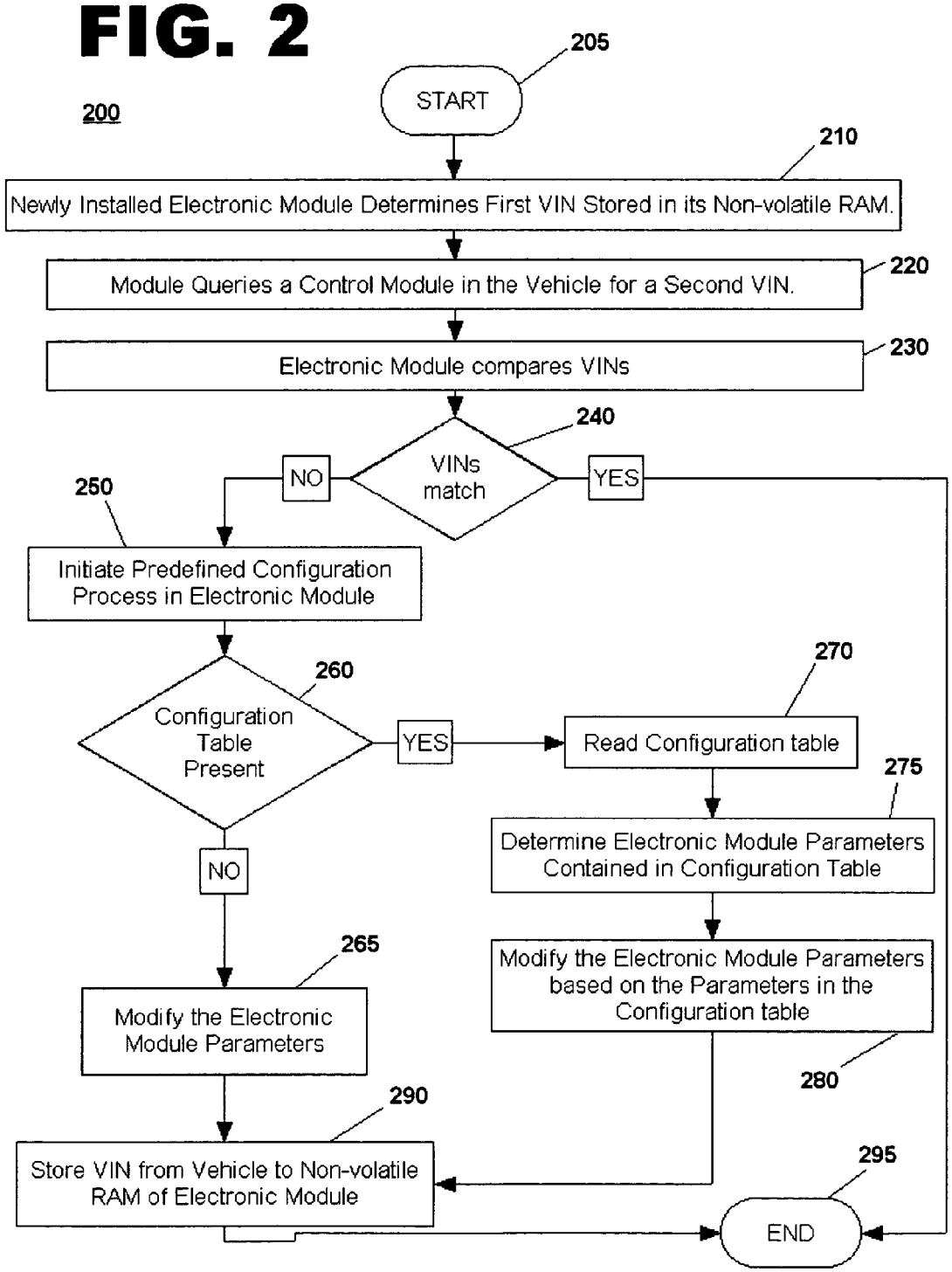

AUTOMATED ELECTRONIC MODULE CONFIGURATION WITHIN A VEHICLE

FIELD OF THE INVENTION

This invention relates generally to electronic modules for mobile vehicles. In particular the invention relates to a system and method for configuring an electronic module within a vehicle.

BACKGROUND OF THE INVENTION

One of the fastest growing areas of communications technology is related to automobile network solutions. The demands and potential for wireless vehicle communication, networking and diagnostic services have escalated in recent years, with projections that by 2006 almost all new American cars will have some level of telematics service. Although many vehicles on the road today have limited wireless communication functions, such as unlocking a door and setting or disabling a car alarm, new vehicles offer additional wireless communication systems that help personalize comfort settings, run maintenance and diagnostic functions, place telephone calls, access call-center information, update controller systems, determine vehicle location, assist in tracking vehicle after a theft of the vehicle and provide other vehicle-related services. Drivers can call telematics call centers to receive navigational, concierge, emergency, and location services, as well as other specialized help such as locating the geographical position of a vehicle that is stolen and honking the horn of a vehicle to locate it in a large parking garage.

Electronic modules, including a telematics module, from a vehicle store configuration data for that specific vehicle in the module's memory. When an electronic module is removed from a vehicle it retains configuration parameters in non-volatile memory. If the electronic module is then installed in a different vehicle certain features specific to that vehicle are not available unless the parameters saved in the electronic module are modified. Electronic modules are recycled from other vehicles either through a reclamation or rework process or through hardware swapping in the field. An electronic module that is moved from a source vehicle to a target vehicle must be configured to provide the proper functions to the target vehicle. In some instances an electronic module will not operate properly if the configuration process is not executed after the electronic module is moved between vehicles. Service personnel cannot execute the configuration process if they are not aware of the required configuration process or do not have the proper equipment to initiate the process. A telematics service provider will not have the proper vehicle information and vehicle owner information in its database necessary to supply contracted services if a telematics module is not reconfigured when it is moved between vehicles.

It is desirable therefore, to provide a system and method for configuring an electronic module within a vehicle, that overcomes the challenges and obstacles described above.

SUMMARY OF THE INVENTION

One aspect of the present invention provides a method for configuring an electronic module within a vehicle. The method determines a first vehicle identification number stored in the electronic module and determines a second vehicle identification number stored in the vehicle. The method then compares the first vehicle identification number from the electronic module and the second vehicle identification number from the vehicle and configures the electronic module based on the comparison.

Another aspect of the present invention provides a computer usable medium including program code for configuring an electronic module within a vehicle. The computer program code determines a first vehicle identification number stored in the electronic module and determines a second vehicle identification number stored in the vehicle. The computer program code then compares the first vehicle identification number from the vehicle electronic module and the second vehicle identification number from the vehicle and configures the vehicle electronic module based on the comparison.

Another aspect of the present invention provides a system for configuring a vehicle electronic module within a vehicle. The system comprises: means for determining a first vehicle identification number stored in the electronic module, means for determining a second vehicle identification number stored in the vehicle, means for comparing the first vehicle identification number from the electronic module and the second vehicle identification number from the vehicle, and means for configuring the electronic module based on the comparison.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flow diagram outlining one embodiment of a method for configuring an electronic module within a vehicle in accordance with the invention.

DETAILED DESCRIPTION OF THE PRESENTLY PREFERRED EMBODIMENTS

Figure 1:
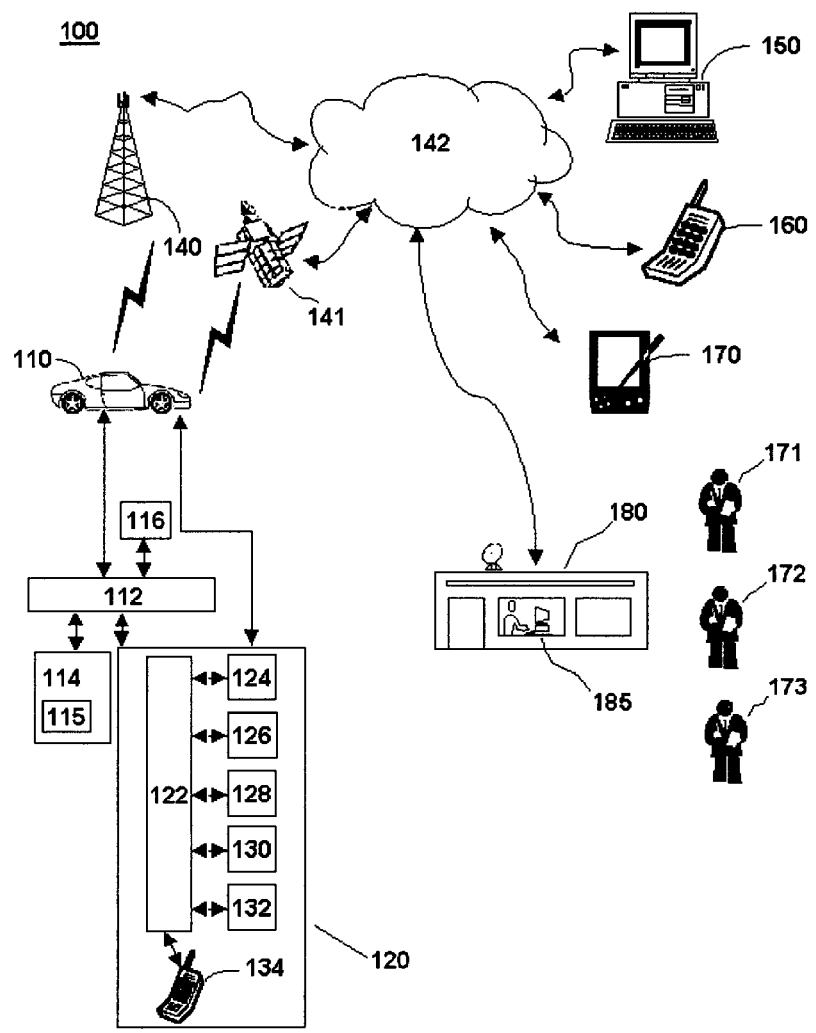
FIG. 1 is a schematic of one embodiment of a system for configuring an electronic module within a vehicle in accordance with the invention.

FIG. 1 is a schematic of one embodiment of a system for configuring an electronic module within a vehicle in accordance with the invention at 100. Automated electronic module configuration within a vehicle system 100 includes a mobile vehicle 110, a telematics module 120, other electronic modules 114, one or more wireless carrier systems 140 one or more satellite carrier systems 141, one or more communication networks 142, and one or more call centers 180. In one embodiment, mobile vehicle 110 is a vehicle such as a car or truck equipped with suitable hardware and software for transmitting and receiving voice and data communications.

In one embodiment, telematics module 120 includes a digital signal processor (DSP) 122 connected to a wireless modem 124, a global positioning system (GPS) receiver or GPS unit 126, a telematics module memory 128, a microphone 130, one or more speakers 132, and an embedded or in-vehicle phone 134. DSP 122 is referred to as a microcontroller, controller, host processor, or vehicle communications processor. GPS unit 126 can provide longitude and latitude coordinates of the vehicle. In-vehicle phone 134 is an analog, digital, dual-mode, dual-band, multi-mode or multi-band cellular phone.

Telematics module 120 can store vehicle data upload (VDU) records numbers in telematics module memory 128. Telematics module 120 can set or reset calling-state indicators and can enable or disable various cellular-phone and telematics module functions when directed by microcode running on DSP 122. Telematics module 120 can send and receive over-the-air messages using, for example, a pseudo-standard air-interface function or other proprietary and non-proprietary communication links.

DSP 122 executes various computer programs and computer program code that control programming and operational modes of electronic and mechanical systems within telematics module 120. DSP 122 can control communications between telematics module 120, wireless carrier system 140 or satellite carrier system 141 and call center 180.

DSP 122 controls, generates and accepts digital signals transmitted between telematics module 120 and a vehicle communication bus 112 that is connected to other electronic modules 114 and sensors 116 in mobile vehicle 110. DSP 122 activates various programming and operation modes, as well as provides for data transfers. Mobile vehicle 110 via telematics module 120 sends and receives radio transmissions from wireless carrier system 140, or satellite carrier system 141. Wireless carrier system 140, or satellite carrier system 141 is any suitable system for transmitting a signal from mobile vehicle 110 to communication network 142.

Communication network 142 includes services from mobile telephone switching offices, wireless networks, public-switched telephone networks, and Internet protocol (IP) networks. Communication network 142 is comprised of a wired network, an optical network, a fiber network, another wireless network, or any combination thereof. Communication network 142 connects to mobile vehicle 110 via wireless carrier system 140, or satellite carrier system 141. Communication network 142 connects wireless carrier system 140, or satellite carrier system 141 to user computer 150, cellular phone 160, handheld device, such as personal digital assistant 170, and call center 180. Communication network 142 sends and receives short messages according to established protocols such as IS-637 standards for short message service (SMS), IS-136 air-interface standards for SMS, and GSM 03.40 and 09.02 standards. Similar to paging, an SMS communication is posted along with an intended recipient, such as a communication device in mobile vehicle 110.

Call center 180 is a location where many calls are received and serviced at the same time, or where many calls are sent at the same time. In one embodiment, call center is a telematics call center, prescribing communications to and from telematics module 120 in mobile vehicle 110. In another embodiment, call center 180 is a voice call center, providing verbal communications between an advisor 185 in the call center 180 and a subscriber. In a further embodiment, call center 180 contains each of these functions. Call center 180 receives a telematics module access request from a telematics user via wireless carrier system 140, satellite carrier system 141 or communication network 150.

Call center 180 provides services to telematics module 120. Communication services advisor 185 provides electronic module configuration service, door unlock service, vehicle locate service and other services available to the subscriber. Call center 180 transmits data via data signal, such as a vehicle data upload (VDU), to telematics module 120 in mobile vehicle 110 through wireless carrier system 140, satellite carrier systems 141, or communication network 142.

Communication services advisor 185 is a real advisor or a virtual advisor. A real advisor is a human being in verbal communication with a user or subscriber. In one embodiment, a virtual advisor is a synthesized voice interface responding to requests from telematics module 120 in mobile vehicle 110. The virtual advisor can include one or more recorded messages.

Call center 180 can determine mobile identification numbers and telematics module identifiers associated with a telematics module access request, compare mobile identification numbers and telematics module identifiers with a database of identifier records, and send calling-state messages to the telematics module 120 based on the request and identification numbers.

In one embodiment, mobile vehicle manufacturer 171, mobile vehicle dealer 172, or mobile vehicle owner 173 has user computer 150 or handheld device 170. Local provisioning system such as user computer 150 or handheld device 170 has a wireless modem to send data through a wireless carrier system 140, or satellite carrier systems 141, which connects to communication network 142. Data is received at call center 180. Call center 180 has any suitable hardware and software capable of providing web services to help transmit messages and data signals from local provisioning system, such as, user computer 150 or handheld device 170 to telematics module 120 in mobile vehicle 110. In another embodiment, user computer 150 or handheld device 170 with the proper hardware and software, connects to mobile vehicle 110 using a direct link to a mobile vehicle onboard data port.

In one embodiment, a first vehicle identification number (VIN) is stored in the non-volatile memory 115 of an electronic module 114 or telematics module memory 128 of telematics module 120. Every vehicle is assigned a unique VIN. Available electronic modules 114 include: powertrain control module (PCM), body control module (BCM), transfer case shift control module, electronic control module (ECM), inflatable restraint sensing and diagnostic module, theft deterrent control module, memory seat module, drivers information center (DIC), key/lights/seatbelt chimes, instrument panel cluster (IPC), suspension control module, electronic brake control module (EBCM), and other modules. Telematics module 120 is another electronic module in vehicle 110. Each vehicle type employs a different subset of the modules available and some vehicles have features from multiple electronic modules integrated into one module type. The stored VIN identifies the specific vehicle 110 for which the electronic module 114 or telematics module 120 is configured. A new configuration is required if the electronic module 114 or telematics module 120 is removed from one vehicle and installed in a different vehicle. The configuration is changed by a software routine resident in the electronic module 114 or telematics module 120. The software routine is the pre-defined configuration process that is executed when power is supplied to the electronic module 114 or telematics module 120.

The pre-defined configuration process is required to ensure the proper function of the electronic module with the vehicle into which the module is installed. An electronic module 114 or telematics module 120 that is moved from a source vehicle to a target vehicle must be reconfigured to provide the proper functions to the target vehicle. The pre-defined configuration process is coded to modify certain parameters of the particular electronic module 114 or telematics module 120. For example, the telematics module 120 must have the vehicle owner's phone number and email address modified for proper functioning of the phone. Additionally, the theft deterrent control module must have the proper vehicle security features enabled. In another example, the powertrain control module must have the parameters for transmission type modified to match the transmission type of the vehicle in which it is installed. In a further example, the body control module must have the parameters associated with climate control modified to correspond to the vehicle in which it is installed. One such parameter is whether the climate control system is a single zone or a multi-zone system. The configuration process enables custom features the vehicle owner has purchased, by modifying parameters associated with those features.

In one embodiment the pre-defined configuration process employs a configuration table stored in the electronic module's non-volatile memory 115 or in another module's non-volatile memory. In another embodiment, multiple configuration tables are available to the pre-defined configuration process. The configuration table instructs the configuration process as to the proper parameter settings for the module 114 or telematics module 120 in a particular vehicle 110. Alternately, the configuration table instructs the electronic module 114 or telematics module 120 to contact a call center 180. Call center is contacted through telematics module 120 via wireless carrier system 140, satellite carrier system 141 or communication network 150. An Advisor 185 at call center 180 will then transmit, through telematics module 120, the proper parameter settings to program the electronic module 114 or telematics module 120.

In an alternate embodiment no configuration table is used. The instructions for configuring the electronic module 114 or telematics module 120 with the proper parameters are contained in the pre-defined configuration process.

In a further embodiment, an electronic module has a pre-defined dummy VIN stored in its non-volatile RAM. The dummy VIN initiates a test method for the electronic module 114 or telematics module 120 or identifies the electronic module 114 or telematics module 120 as a new module.

FIG. 2 is a flow chart of one embodiment of a method 200 for configuring an electronic module within a vehicle in accordance with the invention. The automated electronic module configuration within a vehicle method begins when power is applied to the electronic module (block 205). This is the initial power-up of the electronic module. This method also executes when power is first applied to the module after power disconnect, battery failure, or other hard power outage. Upon power-up the electronic module will read the non-volatile RAM of the module for a first VIN (vehicle identification number) (block 210). Examples of non-volatile RAM are flash memory, read only memory (ROM), and static RAM. The electronic module will also query a control module in the vehicle for a second VIN stored therein (block 220). The electronic module compares the two VINs obtained (block 230) and will detect either a match or a mismatch of the VINs (block 240). If the VINs match, as when a defective module is repaired and then re-installed in the same vehicle, no configuration is required and the method ends (block 295). If the VINs do not match, as when a new or reclaimed module is installed in a vehicle, a predefined configuration process is initiated (block 250). The presence of a configuration table is determined (block 260). If a configuration table is not present, the electronic module parameters are modified based on the pre-defined configuration process (block 265), the VIN obtained from the control module is written to and stored by the electronic module's non-volatile memory (block 290), and the method ends (block 295). If a configuration table is present, the configuration table is read (block 270) and the electronic module parameters contained in the configuration table are determined (block 275). The electronic module parameters are then modified based on the parameters in the configuration table (block 280). Next, the VIN obtained from the control module is written to and stored by the non-volatile memory of the electronic module (block 290), and the method ends (block 295).

The invention can also take the form of a computer usable medium including a program for configuring an electronic module within a vehicle. The program stored in the computer usable medium comprises computer program code for executing the method steps described in FIG. 2 and above.

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A method for configuring a electronic module within a vehicle comprising:
   determining a first vehicle identification number stored in the electronic module;
   determining a second vehicle identification number stored in the vehicle;
   comparing the first vehicle identification number from the electronic module and the second vehicle identification number from the vehicle; and
   configuring the electronic module based on a mismatch detected between the first vehicle identification number and the second vehicle identification number.

2. The method of claim 1 wherein configuring the electronic module comprises:
   initiating a predefined configuration process;
   modifying an electronic module parameter; and
   storing the second vehicle identification number determined from the vehicle to the memory of the electronic module thereby replacing the first vehicle identification number with the second vehicle identification number in the electronic module.

3. The method of claim 1 wherein configuring the electronic module comprises:
   reading a stored configuration table;
   determining an electronic module parameter contained in the stored configuration table; and
   modifying the electronic module parameter based on the parameter in the stored configuration table.

4. The method of claim 1 wherein determining the first vehicle identification number stored in the electronic module is initiated upon power-up of the electronic module.

5. The method of claim 1 wherein the memory of the electronic module is a non-volatile random access memory.

6. A computer usable medium including a program for configuring an electronic module within a vehicle comprising:
   computer program code for determining a first vehicle identification number stored in the electronic module;
   computer program code for determining a second vehicle identification number stored in the vehicle;
   computer program code for comparing the first vehicle identification number from the electronic module and the second vehicle identification number from the vehicle; and computer program code for configuring the electronic module based on a mismatch detected between the first vehicle identification number and the second vehicle identification number.

7. The computer usable medium of claim 6 wherein the computer program code for configuring the electronic module comprises:
   computer program code for initiating a predefined configuration process;
   computer program code for modifying an electronic module parameter; and
   computer program code for writing the second vehicle identification number determined from the vehicle to the memory of the electronic module thereby replacing the first vehicle identification number with the second vehicle identification number in the electronic module.

8. The computer usable medium of claim 6 wherein, the computer program code for configuring the electronic module comprises:
   computer program code for reading a stored configuration table;
   computer program code for determining an electronic module parameter contained in the stored configuration table; and
   computer program code for modifying the electronic module parameter based on the parameter in the stored configuration table.

9. The computer usable medium of claim 6 wherein the computer program code for determining the first vehicle identification number stored in an electronic module is initiated upon power-up of the electronic module.

10. A system for configuring an electronic module within a vehicle comprising:
    means for determining a first vehicle identification number stored in the electronic module;
    means for determining a second vehicle identification number stored in the vehicle;
    means for comparing the first vehicle identification number from the electronic module and the second vehicle identification number from the vehicle; and
    means for configuring the electronic module based on a mismatch detected between the first vehicle identification number and the second vehicle identification number.

11. The system of claim 10 wherein means for configuring the electronic module comprises:
    means for initiating a predefined configuration process;
    means for modifying an electronic module parameter; and
    means for writing the second vehicle identification number determined from the vehicle to the memory of the electronic module thereby replacing the first vehicle identification number with the second vehicle identification number in the electronic module.

12. The system of claim 10 wherein means for configuring the electronic module comprises:
    means for reading a stored configuration table;
    means for determining an electronic module parameter contained in the stored configuration table; and
    means for modifying the electronic module parameter based on the parameter in the stored configuration table.

13. The method of claim 1 wherein configuring an electronic module comprises placing a call to a telematics call center and receiving the electronic module parameter from the call center.

14. The method of claim 3 wherein the stored configuration table is stored in a telematics unit.

15. The method of claim 3 wherein a plurality of configuration tables are available to the electronic module.

16. The computer usable medium of claim 6 wherein computer program code for configuring an electronic module comprises computer program code for placing a call to a telematics call center and computer program code for receiving the electronic module parameter from the call center.

17. The system of claim 10 wherein means for configuring an electronic module comprises means for placing a call to a telematics call center; and means for receiving the electronic module parameter from the call center.

* * * * *